United States Patent
Gillan et al.

(10) Patent No.: US 11,428,940 B2
(45) Date of Patent: Aug. 30, 2022

(54) HIGH-DIMMING-RATIO AVIONICS DISPLAY

(71) Applicant: Garmin International, Inc., Olathe, KS (US)

(72) Inventors: Iain P. Gillan, Olathe, KS (US); Steven A. Stringfellow, Overland Park, KS (US); Ryan K. Eakin, Lawrence, KS (US)

(73) Assignee: Garmin International, Inc., Olathe, KS (US)

( * ) Notice: Subject to any disclaimer, the term of this patent is extended or adjusted under 35 U.S.C. 154(b) by 176 days.

(21) Appl. No.: 16/837,712

(22) Filed: Apr. 1, 2020

(65) Prior Publication Data
US 2021/0311309 A1 Oct. 7, 2021

(51) Int. Cl.
*G02B 27/01* (2006.01)
*G02B 27/14* (2006.01)
*G03B 21/20* (2006.01)
*H05B 41/392* (2006.01)

(52) U.S. Cl.
CPC ..... *G02B 27/0172* (2013.01); *G02B 27/0101* (2013.01); *G02B 27/0179* (2013.01); *G02B 27/145* (2013.01); *G02B 2027/0118* (2013.01); *G02B 2027/0187* (2013.01); *G03B 21/2033* (2013.01); *H05B 41/3927* (2013.01)

(58) Field of Classification Search
CPC ............ G02B 27/0172; G02B 27/0179; G02B 27/145; G02B 2027/0118; G02B 2027/0187; G03B 21/2033; H05B 41/3927
See application file for complete search history.

(56) References Cited

U.S. PATENT DOCUMENTS

| | | | |
|---|---|---|---|
| 6,215,680 B1 | 4/2001 | Rolston | |
| 6,504,518 B1 | 1/2003 | Kuwayama et al. | |
| 6,864,927 B1 | 3/2005 | Cathey | |
| 6,987,787 B1 | 1/2006 | Mick | |
| 2002/0154277 A1* | 10/2002 | Mukawa | H04N 9/3164 353/31 |
| 2003/0156330 A1* | 8/2003 | Edlinger | G02B 27/1086 359/618 |
| 2005/0013132 A1* | 1/2005 | Kim | H04N 9/315 362/231 |
| 2016/0154244 A1 | 6/2016 | Border et al. | |
| 2017/0099469 A1* | 4/2017 | Matsumoto | H04N 9/3194 |
| 2017/0276546 A1* | 9/2017 | Sakai | G01J 3/10 |
| 2017/0371236 A1* | 12/2017 | Guo | G03B 21/2053 |
| 2018/0067308 A1* | 3/2018 | Sakai | H04N 9/3129 |
| 2019/0097396 A1* | 3/2019 | Sakai | H01S 5/4093 |
| 2019/0324179 A1* | 10/2019 | Thyagarajan | C23C 16/06 |
| 2021/0162924 A1* | 6/2021 | Ohyama | G02B 27/0101 |
| 2021/0168339 A1* | 6/2021 | Ohyama | G03B 17/54 |

* cited by examiner

*Primary Examiner* — Bao-Luan Q Le
(74) *Attorney, Agent, or Firm* — Samuel M. Korte; Max M. Ali

(57) ABSTRACT

Disclosed are dual-light-source, high dimming-ratio avionics displays with digital light processing projector technology for rendering a visual display from generated light. The dual light sources are directed towards a beam splitter adapted to pass a substantial portion of the light from the first light source and to reflect a minority portion of the light from the second light source. An image is rendered at a substantially transparent, selectively reflective substrate adapted to reflect light of a range of visible wavelengths toward a viewer of the displays.

16 Claims, 6 Drawing Sheets

HIGH-DIMMING-RATIO AVIONICS DISPLAY

BACKGROUND

It's desirable for avionics displays to exhibit a proper range of brightness. At one extreme, when an aircraft is flying above the clouds and the sun is shining down on the aircraft and reflecting on the surface of the clouds, the ambient light is so bright that to be seen a display must be extremely bright. At the opposite extreme, when an aircraft is being piloted at night, the display should be quite dim. Accordingly, augmented reality technologies such as Head-Up Displays (HUD's) or Head Mounted Displays (HMD's) are required to operate in a range of environments. These displays must be able to reach high luminance levels and low luminance levels, with a smooth transition for all points in between.

SUMMARY

Techniques are disclosed to enable production and operation of a high-dimming-ratio avionics display with a digital light processing projector for rendering a visual display from generated light. The display has a first light source comprising a first light emitting diode and a first light emitting diode drive circuit, the first light source projecting light of a first light source intensity in the direction of the digital light processing projector. The display further includes a second light source comprising a second light emitting diode and a second light emitting diode drive circuit, the second light source projecting light in a direction that is angularly disposed to that of the first light source projection, the second light source having a second light source intensity that is lower than the first light source intensity. In addition, disclosed is a beam splitter adapted to pass a substantial portion of the light from the first light emitting diode and to reflect a minority portion of the light from the second light emitting diode and a substantially transparent, selectively reflective substrate adapted to reflect light within a notch of visible wavelengths to reflect the rendered visual display toward a viewer of the display.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWINGS

The figures described below depict various embodiments of the present invention. It is understood that these figures depict exemplary embodiments. The exemplary features illustrated in the figures are intended to represent these aspects of the various disclosed embodiments and not intended to limit the claimed scope to any particular feature. Further, whenever possible, the following description refers to the reference numerals included in the figures, in which features depicted in multiple figures are designated with consistent reference numerals.

DETAILED DESCRIPTION

Figure 1:
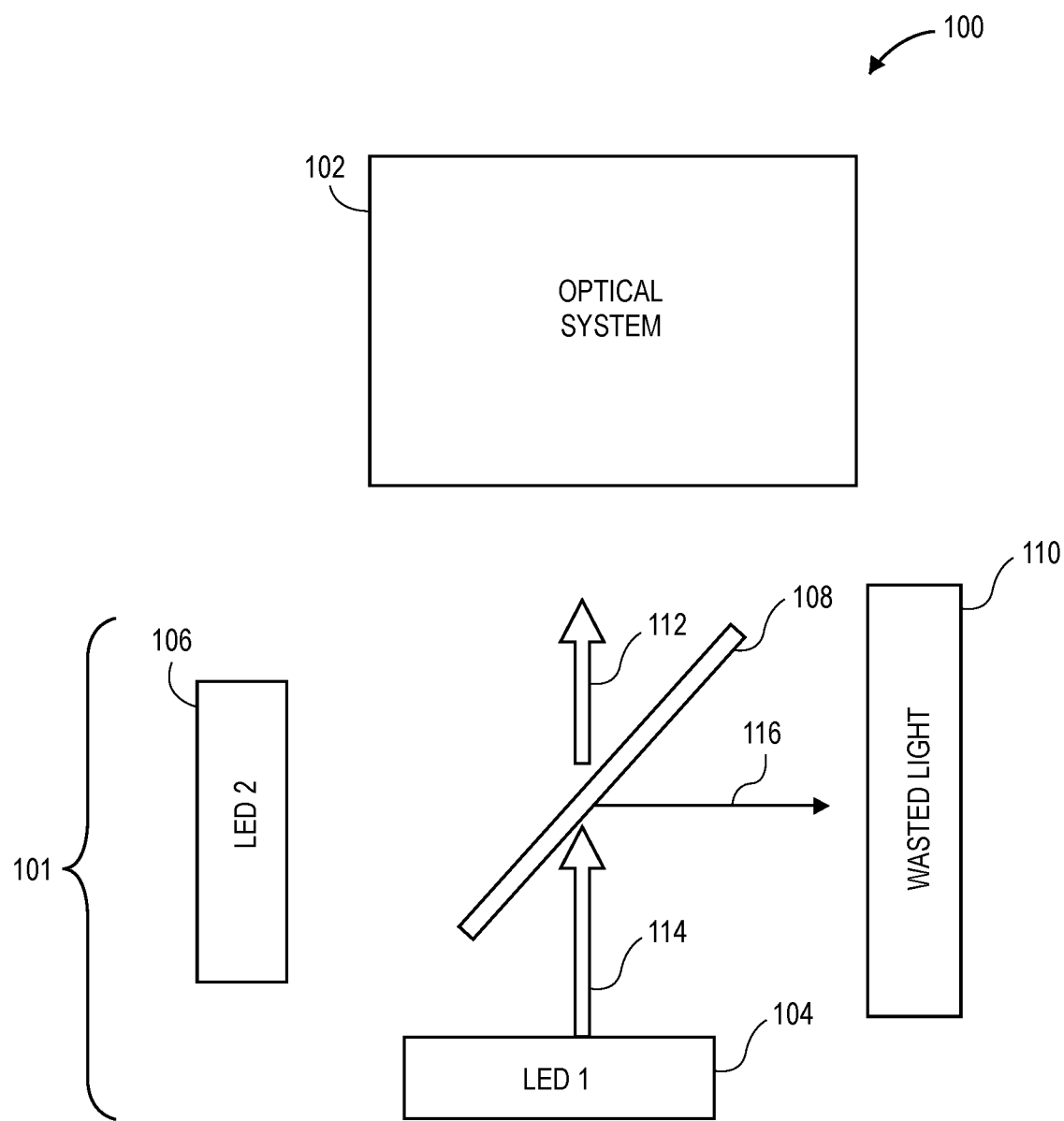
FIG. 1 is a block diagram of a light generation system providing high-intensity light to an optical system that is operable with a high-dimming ratio head-up avionics display.

The following text sets forth a detailed description of numerous different embodiments. However, it is understood that the detailed description is to be construed as exemplary only and does not describe every possible embodiment since describing every possible embodiment would be impractical. In light of the teachings and disclosures herein, numerous alternative embodiments may be implemented.

It is understood that, unless a term is expressly defined in this patent application using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent application.

The following detailed description of the technology references the accompanying drawings that illustrate specific embodiments in which the technology may be practiced. The embodiments are intended to describe aspects of the technology in sufficient detail to enable those skilled in the art to practice the technology. Other embodiments may be utilized and changes may be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology may include a variety of combinations and/or integrations of the embodiments described herein.

Embodiments of the technology apply to the field of avionics displays, and more specifically, to high-dimming-ratio avionics displays. As set forth herein, an "optical system" relates to a receiver of a light source that is used to project a display. A "combiner" relates to a film or coating that is selectively reflective of a range or ranges of wavelengths of light and non-reflective of others. In this way, a combiner can be used to reflect a display on an otherwise substantially transparent surface such as the cockpit windscreen of an aircraft or another optical element.

Disclosed are techniques that allow the avionics displays to achieve a sufficiently high dimming ratio required for maximum and minimum luminance, while also providing sufficient dimming steps at low luminance levels to noticeably adjust the brightness in dim lighting conditions, thereby satisfying the human eye response, which is more sensitive in lower lighting conditions. When adjusting the luminance levels of actual LEDs, as the current in the LED is varied, the wavelength of the produced light shifts, which impacts system design, i.e. the range of wavelengths that need to be reflected to the user. As set forth below in connection with FIG. 6, in various embodiments, the use of reflective notch coatings on the combiner cover the wavelength shift of the LED so as to reflect the shifted wavelengths and thereby still adequately display the desired image to a user of the avionics display. While observed "brightness" is relative, typical brightness values encountered in aviation as outside ambient light conditions range between about 34,262 cd/m^2 and pitch dark. By way of reference, a typical photographic scene in full sunlight is about 5,000 cd/m^2.

As further described below, in order to increase dimming ratio, a second LED and driver are provided with a calibrated crossover point between illumination of the first and second LEDs. This can achieve a dimming ratio of up to the value of the dimming ratio of a single drive to the second power (squared). These are coupled into the illumination system using a beam splitter, which allows for a high percentage (e.g. 97%) of the first LED to pass through the beam splitter, this providing a high-level of brightness. Only a small percentage of light (e. g. 3%) is wasted by the beam splitter. In embodiments, a dimming ratio of at least 200,000:1 may be achieved.

FIG. 1 is a block diagram of a light generation system providing high-intensity light to an optical system that is operable with a high-dimming ratio head-up avionics display. In various embodiments, display system 100 is configured such that a relatively high-intensity beam of light 112 is directed at optical system 102. Typically, this configuration is used in relatively bright lighting conditions, for example when an aircraft is being operated during the day in direct sunlight. It is understood that other less bright lighting conditions such as during the day in an overcast environment or even at dawn or dusk will still require a relatively bright beam of light from the light source, while typically not as bright as ambient light conditions when the aircraft is flying above clouds in direct sunlight or during the day when there is a clear sky. The display may be projected forward at eye-level of a flight crew of an aircraft to serve as a head-up display for the flight crew, be integrated or mounted to a helmet for a helmet mounted display, or utilized in other similar configurations.

In various embodiments, light generation system 101 is provided to produce the beam of light 112 through beam splitter 108. In various embodiments, the beam splitter 108 is oriented at approximately 45 degrees between a first light emitting diode ("LED1") 104 and the optical system 102. In such embodiments, most of the light generated from the LED1 104 in the form of a LED1 light beam 114 will pass through the beam splitter 108 to become the beam of light 112, nevertheless, a portion of the LED1 light beam 114 will be reflected at the beam splitter 108 in the form of reflected light 116 which becomes wasted light 110. In various embodiments, LED2 106 is not energized and does not provide any light to the light generation system 101. It is understood that the LED2 106, however, could be energized to provide an additional source of brightness if needed.

Figure 2:
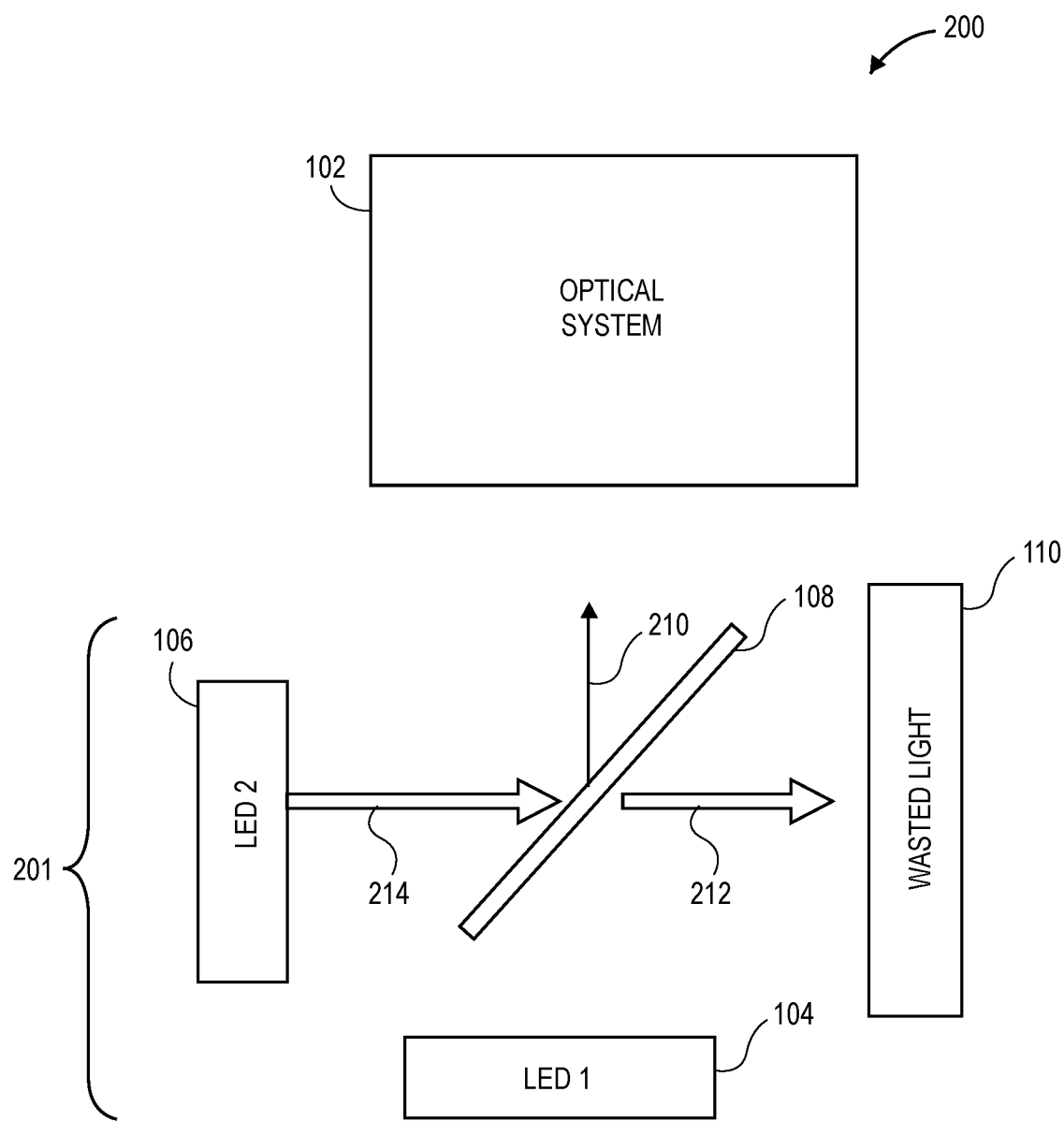
FIG. 2 is a block diagram of a light generation system providing low-intensity light to an optical system that is operable with a high-dimming ratio head-up avionics display.

FIG. 2 is a block diagram of a light generation system providing low-intensity light to an optical system that is operable with a high-dimming ratio head-up avionics display. In various embodiments, display system 200 is configured such that a relatively lower-intensity beam of light 210 is directed at the optical system 102 of FIG. 1. Typically, this configuration is used in relatively lower lighting conditions, for example when an aircraft is being operated at night or in other low-light conditions. It is understood that other more intensely bright lighting conditions such as around the time of sunset or sunrise will still require a relatively lower intensity beam of light from the light source than at night. Thus, embodiments of the present invention provide visibility in outside ambient conditions of direct sunlight and in outside ambient conditions of darkness.

In various embodiments, light generation system 201 produces the beam of light 210 by reflecting off the beam splitter 108. In various embodiments similar to the configuration described in connection with FIG. 1, the beam splitter 108 is oriented at approximately 45 degrees between the LED2 106 and the optical system 102. In such embodiments, most of the light generated from the LED2 106 in the form of a LED2 light beam 214 will pass through the beam splitter 108 to become the wasted beam of light 212 which becomes wasted light 110. In various embodiments, LED1 104 is not energized and does not provide any light to the light generation system 101. It is understood that the LED1 104, however, could be energized to provide an additional source of brightness if needed, for example when transitioning from a low light condition to one that requires brighter light. Additionally or alternatively LED1 and LED2 may be used at all times with varying duty cycles to achieve a desired brightness and dimming ratio.

In various embodiments, LED2 106 only contributes a small percentage of its light into the light generation system 201. Nevertheless, it has a similarly large dimming ratio as the LED1 104 as further described in connection with FIG. 5. For instance, if there are 1000 dimming steps between 97% brightness and 3%, there will also be 1000 dimming steps between 3% and 0.093% brightness, which is important as the logarithmic response of the eye is more sensitive to changes in dark conditions. In various embodiments, the specific relationship between the percentage transmitted to the percentage reflected is selected to optimize between the dimming range, providing sufficient overlap to allow for calibration of components (i.e. LEDs) that are received with divergent specifications due to manufacturing variations, as well as being able to work with lower rated electrical components, which provides a potential cost savings.

Figure 3:
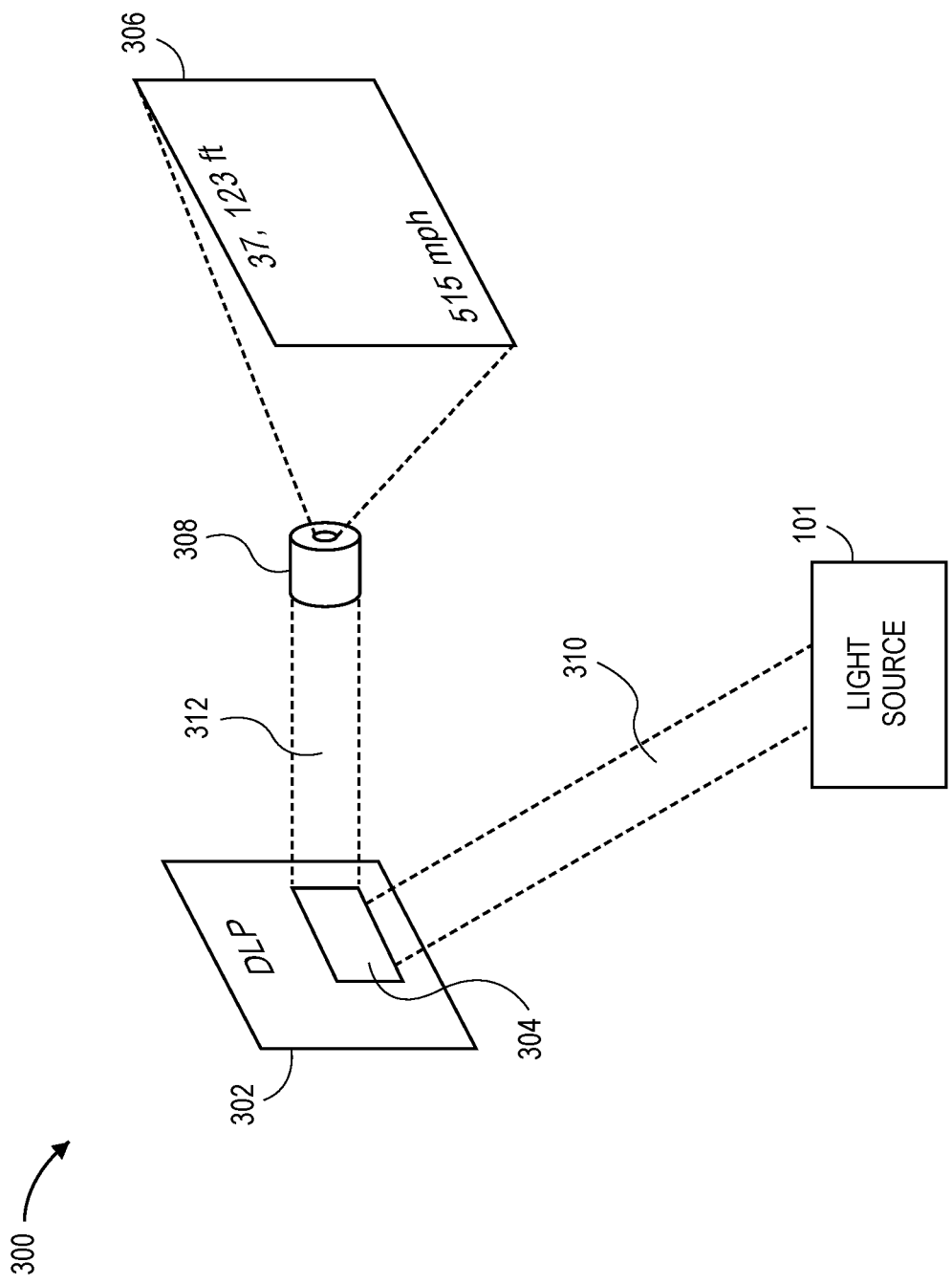
FIG. 3 is a schematic depiction of elements of a high-dimming ratio head-up avionics display.

FIG. 3 is a schematic depiction of elements of a high-dimming ratio head-up avionics display 300. In various embodiments, the overall display 300 is made of several components. A digital light projector 302 is provided that reflects green light 310 from the light source 101 (of FIG. 1) by way of a micro mirror array 304. In various embodiments, green light is selected because it is a standard in the avionics industry due to human perception factors. And also due to the complexity of resolving chromatic related aberrations for conventional off-axis HUD's. However, any colors, including a color display, may be utilized.

In various embodiments, this reflected light 312 is directed to a lens 308 which projects a desired image onto a combiner 306 which reflects desired wavelengths of light so as to provide a clear head-up display of a desired brightness to a user of the overall display 300.

Figure 4:
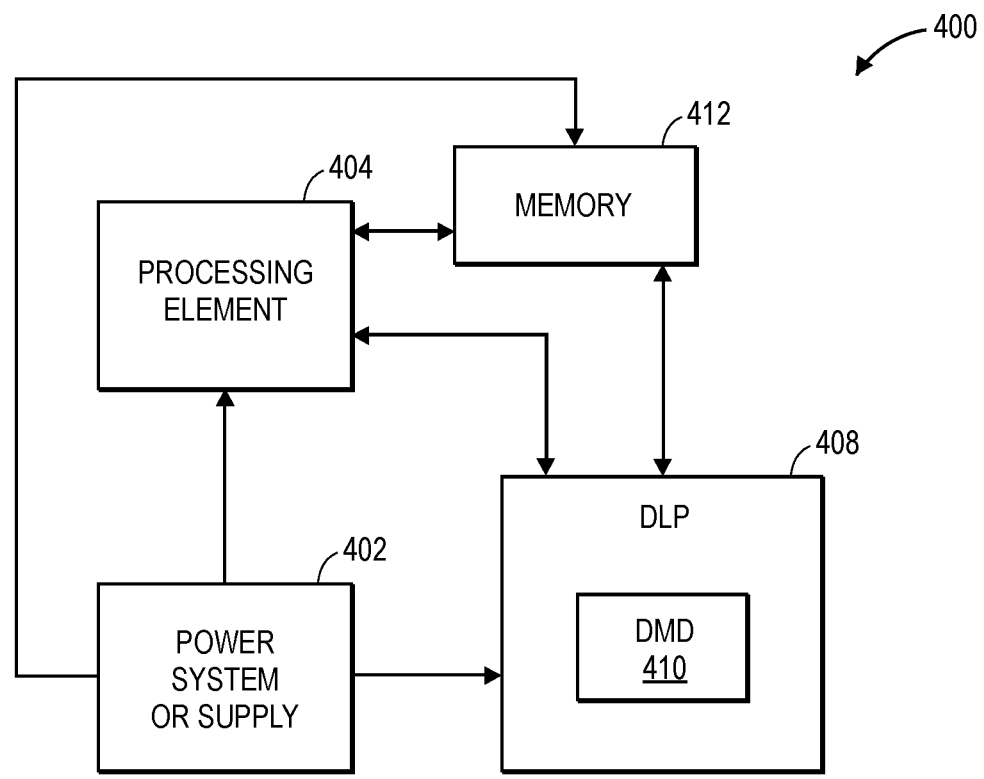
FIG. 4 is a schematic depiction of electronic elements of a high-dimming ratio head-up avionics display.

FIG. 4 is a schematic depiction of electronics system 400 in a high-dimming ratio head-up avionics display. Electronics system 400 is made up of a processing element 404 which may be implemented using any appropriate technology and design, and may include processors, microprocessors, microcontrollers, digital signal processors (DSPs), field-programmable gate arrays (FPGAs), analog and/or digital application-specific integrated circuits (ASICs), or the like, or combinations thereof. The processing element 404 may generally execute, process, or run instructions, code, code segments, software, firmware, programs, applications, apps, processes, services, daemons, or the like, or may step through the states of a finite-state machine. In various embodiments, the processing element 404 is communicatively coupled to, among other things, a memory 412 which may be implemented using any appropriate technology and design, and may include data storage components such as read-only memory (ROM), programmable ROM, erasable programmable ROM, random-access memory (RAM), disks, flash memory, thumb drives, universal serial bus (USB) drives, or the like, or combinations thereof. The memory 412 may include, or may constitute, a "computer-readable medium." The memory 412 may store instructions, code, code segments, software, firmware, programs, applications, apps, services, daemons, or the like that are executed by the processing element 404. The memory 412 may also store settings, data, documents, sound files, photographs, movies, images, databases, and the like.

In various embodiments, the electronics system 400 is provided operating power by power supply 402. This may be connected into the operating power system of the aircraft and conditioned to a voltage level as needed by components of the electronics system 400. It is understood that the power supply 402 could also be provided by any other source such as batteries, a USB connection, or the like. In various embodiments, power is also provided to the processing element 404 and any other part of the electrical system 400. In various embodiments, a DLP 408 is provided the DLP 408 having an associated digital micromirror device ("DMD") 410. As set forth in connection with FIG. 3. The DLP controls how the DMD is manipulated to selectively reflect light from a light source (such as those illustrated in FIGS. 1 and 2) to further parts of an optical system (such as the lens 308 of FIG. 3).

Figure 5:
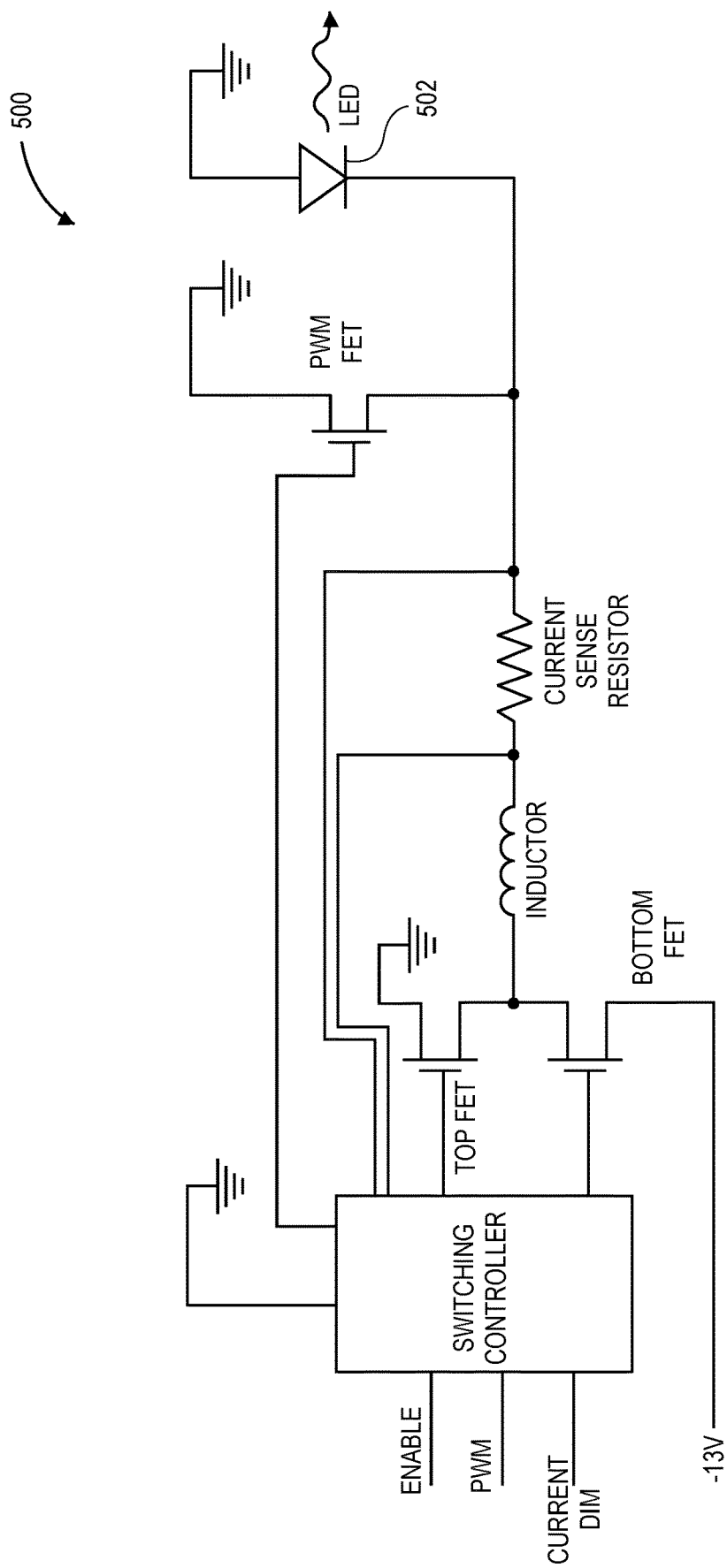
FIG. 5 is a schematic diagram of an LED driver circuit operable in connection with a light generation system providing high-intensity light to an optical system that is operable with a high-dimming ratio head-up avionics display.

FIG. 5 is a schematic diagram of an LED driver circuit operable in connection with a light generation system providing high-intensity light to an optical system that is operable with a high-dimming ratio head-up avionics display. The LED drive circuit 500 should be able to illuminate the LED 502 with a wide dimming ratio. Possible methods of dimming include adjusting the LED current and toggling the LED on and off using Pulse Width Modulation (PWM). Commercially available LED drivers will allow for current dimming on the order of 10:1. Alternatives to DLP projection, such as an LCD based design, would allow the use of PWM LED dimming drivers that can achieve a sufficiently high dimming ratio when the PWM is operated at low frequency. With such a system, current and PWM dimming would therefore provide the required dimming ratio but the use of an LCD projection system would be highly inefficient and would not be sufficiently bright for an aviation display.

However, in a DLP based system, the DLP mirrors toggle at relatively high frequency (on the order of 30 microseconds). To avoid visual artifacts, PWM dimming must be performed at a frequency higher than the DLP mirror operating frequency. This limits the pulse width for PWM and therefore dimming ratio of the PWM to around 100:1. Accordingly, when the current and PWM dimming are both applied to the DLP, a dimming ratio of only 1,000:1 per LED. As set forth above, this limitation is overcome by way of the dual LED approach of the present teachings.

In addition to limitations in LED drive circuits, the LEDs have maximum and minimum current limits. LEDs are available with a maximum current limit on the order of 15 amps. Those LEDs have a minimum current requirement of 200 mA. Therefore even if a suitable LED driver could be deployed, by modulating current alone, the LED itself would be limited to a (current variation) dimming ratio of 75:1. Another benefit of the present teachings is to allow a narrower range of current variations in the driven LEDs, which can expand the usable life of the LEDs and therefore of the overall avionics display product.

Figure 6:
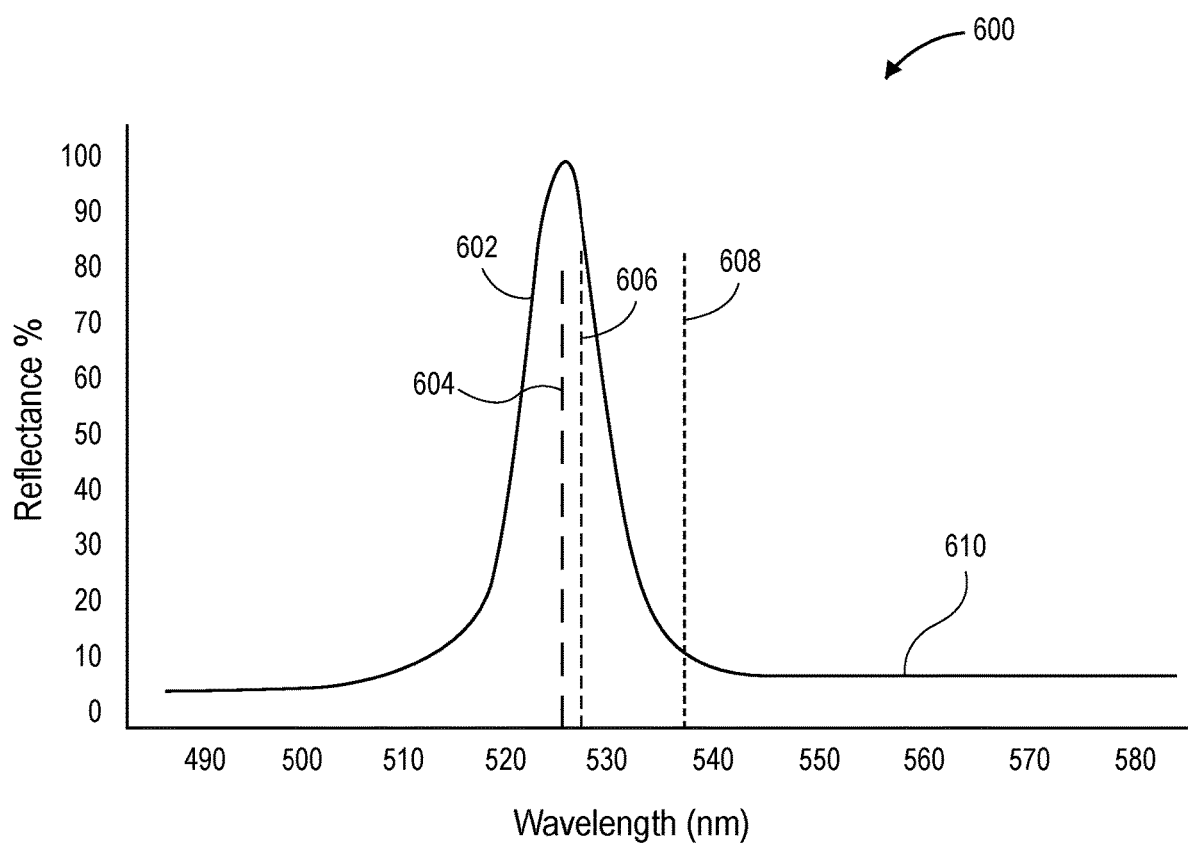
FIG. 6 is a line graph of reflectance percentage to wavelength (expressed in nm) for a combiner to reflect a displayed image in a high-dimming ratio head-up avionics display.

FIG. 6 is a line graph 600 of reflectance percentage to wavelength (expressed in nm) for a combiner (such as the combiner 306 of FIG. 3) to reflect a displayed image in a high-dimming ratio head-up avionics display. Displays consistent with the present teachings should perform in a consistent and repeatable manner without causing distraction to the user as brightness is adjusted or as ambient light changes. Accordingly, in various embodiments, at the time of manufacture, each of the transitions points can be calibrated, i.e. between LED drive circuits and between the two LED's in the system for switching from one LED to the other, due too practical limitations in the manufacture of LEDs which introduce slight variations in the produced wavelength, sometimes known as LED binning. In addition to the variation of LED performance it is also important to understand how the LED operates under certain conditions. As the current used to drive an LED varies, the varied current will cause a shift in the center wavelength emitted. The manufacture-time calibration must factor this in and drive each transition point (from one LED circuit to the other) in a consistent manner. This results a seamless transition, so that the user does not even notice a flicker or transition from one LED circuit to the other.

In various embodiments, an image of wavelength shown at wide-dashed line 604 which falls squarely within the notch of light as shown by line 610 that is reflected by the combiner and therefore visible at the display. In this way, the associated image is produced at the combiner by the avionics display as described in connection with the present teachings. In various embodiments, light produced in connection with the high-dimming-ratio display will have its intensity varied in part by adjusting the current in various LEDs associated with a light source in the display. In various embodiments, the adjusted current will result in a shift of the wavelength of the generated light. As illustrated in FIG. 6, if this shift in wavelength is of a sufficient magnitude as shown at dotted line 608 it will fall outside of the notch for which light is reflected by the combiner. In such a situation, the display would not be visible or at most only faintly visible. Alternatively, if the shift in wavelength is minimized as shown in dashed-line 606, the shifted wavelength will still fall within the notch of reflected wavelengths for the combiner and it will, therefore, still be visible at the display. In one embodiment, the notch of visible light is approximately 510 nm to 530 nm, although any portions of the spectrum may be employed.

An additional benefit of the present teachings is an ability to optimize the width of the notch coating on the combiner with the brightness of the display. The requirement of needing to adjust, or make wider, the range of wavelengths reflected by the notch coating increases the cost and complexity of the combiner, which has a critical impact on the system brightness, uniformity and perception of the field of view on the other side of the windscreen. Producing a very narrow notch coating can be more complex and costly than a wider notch but have the benefit of better transmissivity and system performance. Simply using drive currents to achieve dimming ratios would not only fail to produce a sufficiently great dimming ratio but would also add cost and complexity to the design of an avionics display, as the wavelength shift of the LED must be taken into consideration when designing the combiner. By using the dual LED approach of the present teachings, each LED can operate over a smaller range of currents (and corresponding wavelength shifts). This lowers the wavelength shift thus reducing the complexity of the notch coating design and thereby reducing cost in the overall system as well as increasing visibility through the combiner since it has a narrower notch of reflected wavelengths. It is understood that the design is independent of the optical beam splitter orientation i.e. It is equally valid to design the system with a high % reflection and low % transmission splitter. Additionally, embodiments of the present invention may employ techniques other than reflective notch coatings. For instance, waveguides or broadband reflection coated combiners may be employed.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

What is claimed is:

1. An avionics display comprising:
a digital light processing projector for rendering a visual display from generated light;
a first light source comprising a first light emitting diode and a first light emitting diode drive circuit, the first light source projecting light of a first light source intensity in the direction of the digital light processing projector;
a second light source comprising a second light emitting diode and a second light emitting diode drive circuit, the second light source projecting light in a direction that is angularly disposed to that of the first light source projection, the second light source having a second light source intensity that is lower than the first light source intensity;
a beam splitter adapted to pass a substantial portion of the light from the first light emitting diode and to reflect a minority portion of the light from the second light emitting diode; and
a reflective substrate adapted to reflect the rendered visual display toward a viewer of the display;
wherein the beam splitter passes at least 97% of the light from the first light emitting diode and reflects no more than 3% of the light from the second light emitting diode.

2. The avionics display of claim 1, wherein the display is projected forward at eye-level of a flight crew of an aircraft to serve as a head-up display for the flight crew.

3. The avionics display of claim 1, wherein the beam splitter is orientated at a 45 degree angle to the first light emitting diode.

4. The avionics display of claim 1, wherein the reflective substrate includes a notch filter operable to reflect visible light between approximately 510 nm to 530 nm.

5. The avionics display of claim 1, wherein the first and second light emitting diode drive circuits control the brightness of the first and second light emitting diodes by varying the current in the first and second light emitting diodes.

6. The avionics display of claim 5, wherein the first and second light emitting diode drive circuits control the brightness of the first and second light emitting diodes by means of pulse width modulation.

7. An avionics display comprising:
a digital light processing projector for rendering a visual display from generated light;
a first light source comprising a first light emitting diode and a first light emitting diode drive circuit, the first light source projecting light of a first light source intensity in the direction of the digital light processing projector;
a second light source comprising a second light emitting diode and a second light emitting diode drive circuit, the second light source projecting light in a direction that is angularly disposed to that of the first light source projection, the second light source having a second light source intensity that is lower than the first light source intensity, wherein the first and second light emitting diode drive circuits control the brightness of the first and second light emitting diodes by varying the current in the first and second light emitting diodes and by means of pulse width modulation;
a beam splitter adapted to pass a substantial portion of the light from the first light emitting diode and to reflect a minority portion of the light from the second light emitting diode; and
a substantially transparent, selectively reflective substrate adapted to reflect light within a notch of visible wavelengths to reflect the rendered visual display toward a viewer of the display;
wherein the beam splitter passes at least 97% of the light from the first light emitting diode and reflects no more than 3% of the light from the second light emitting diode.

8. The avionics display of claim 7, wherein the display is projected forward at eye-level of a flight crew of an aircraft to serve as a head-up display for the flight crew.

9. The avionics display of claim 7, wherein the beam splitter is orientated at a 45 degree angle to the first light emitting diode.

10. The avionics display of claim 7, wherein the notch of visible light is approximately 510 nm to 530 nm.

11. An high dimming ratio, head up avionics display comprising:
a digital light processing projector for rendering a visual display from generated light;
a first light source comprising a first light emitting diode and a first light emitting diode drive circuit, the first light source projecting light of a first light source intensity through a beam splitter in the direction of an array of micro-mirrors associated with the digital light processing projector;
a second light source comprising a second light emitting diode and a second light emitting diode drive circuit, the second light source projecting light in a direction that is angularly disposed to that of the first light source projection, the second light source having a second light source intensity that is lower than the first light source intensity, wherein the first and second light emitting diode drive circuits control the brightness of the first and second light emitting diodes by varying the current in the first and second light emitting diodes and by means of pulse width modulation, and wherein the beam splitter is adapted to pass a substantial portion of the light from the first light emitting diode and to reflect a minority portion of the light from the second light emitting diode; and a substantially transparent substrate with a coating adapted to reflect green light of a range of wavelengths to reflect the rendered visual display toward a viewer of the display;

wherein the beam splitter passes at least 97% of the light from the first light emitting diode and reflects no more than 3% of the light from the second light emitting diode.

12. The avionics display of claim 11, wherein the display is projected forward at eye-level of a flight crew of an aircraft to serve as a head-up display for the flight crew.

13. The avionics display of claim 11, wherein the beam splitter is orientated at a 45 degree angle to the first light emitting diode.

14. The avionics display of claim 11, wherein the notch of visible light is approximately 510 nm to 530 nm.

15. The avionics display of claim 11, wherein the display is visible to the pilot of an aircraft in outside ambient conditions of direct sunlight.

16. The avionics display of claim 11, wherein the display is visible in outside ambient conditions of darkness.

* * * * *